United States Patent
Trebas et al.

(10) Patent No.: US 9,898,314 B2
(45) Date of Patent: Feb. 20, 2018

(54) JAVASCRIPT EXTENSION TOOL

(75) Inventors: David Trebas, Irvine, CA (US); Michael Brown, Colorado Springs, CO (US)

(73) Assignee: Michael Brown, Frisco, TX (US)

( * ) Notice: Subject to any disclaimer, the term of this patent is extended or adjusted under 35 U.S.C. 154(b) by 334 days.

(21) Appl. No.: 13/444,575

(22) Filed: Apr. 11, 2012

(65) Prior Publication Data
US 2013/0275942 A1 Oct. 17, 2013

(51) Int. Cl.
*G06F 9/44* (2006.01)
*G06F 9/455* (2018.01)

(52) U.S. Cl.
CPC ........ *G06F 9/45529* (2013.01); *G06F 9/4428* (2013.01)

(58) Field of Classification Search
CPC .................. G06F 9/4428; G06F 9/45529
See application file for complete search history.

(56) References Cited

U.S. PATENT DOCUMENTS

| | | | | |
|---|---|---|---|---|
| 5,995,975 A * | 11/1999 | Malcolm | ............... | G06F 9/4428 |
| 6,438,594 B1 * | 8/2002 | Bowman-Amuah | . | G06F 9/4428 |
| | | | | 709/203 |
| 6,662,236 B1 * | 12/2003 | Apte | ................... | G06F 9/45508 |
| | | | | 717/115 |
| 7,971,194 B1 * | 6/2011 | Gilboa | ...................... | G06F 8/10 |
| | | | | 717/106 |
| 8,566,807 B1 * | 10/2013 | Colton | ................ | G06F 9/45529 |
| | | | | 717/137 |
| 8,584,105 B1 * | 11/2013 | Epshteyn | ............ | G06F 9/45529 |
| | | | | 717/140 |
| 8,849,985 B1 * | 9/2014 | Colton | ................ | G06F 9/45529 |
| | | | | 709/203 |
| 8,983,935 B2 * | 3/2015 | Scoda | ................. | G06F 9/45529 |
| | | | | 707/722 |
| 9,235,398 B2 * | 1/2016 | Fernandez-Ruiz | . | G06F 9/45529 |
| 9,645,838 B2 * | 5/2017 | Ben-Yair | ............. | G06F 9/45529 |
| 2003/0058277 A1 * | 3/2003 | Bowman-Amuah | ............. | G06F 17/30607 |
| | | | | 715/765 |
| 2005/0021754 A1 * | 1/2005 | Alda | ..................... | G06F 9/4428 |
| | | | | 709/225 |
| 2005/0066338 A1 * | 3/2005 | Bloesch | ............... | G06F 9/4428 |
| | | | | 719/328 |
| 2005/0071809 A1 * | 3/2005 | Pulley | .................. | G06F 9/4428 |
| | | | | 717/108 |

(Continued)

OTHER PUBLICATIONS

Krishna Bharat, "SearchPad: Explicit Capture of Search Context to Support Web Search", [Online], 2005, pp. 1-13, [Retrieved from Internet on Sep. 30, 2017], <http://sifaka.cs.uiuc.edu/xshen/reference/BharatKrishna_2000WWW_SearchPad.pdf>.*

(Continued)

*Primary Examiner* — Ziaul A Chowdhury
(74) *Attorney, Agent, or Firm* — Magleby, Cataxinos & Greenwood, P.C.

(57) ABSTRACT

A method, system, and apparatus for extending JavaScript to operate more fully as an object oriented language. A multiple inheritance module may be configured to enable JavaScript to implement multiple inheritance. A messaging module may be configured to enable JavaScript to implement messaging. A polymorphism module may be configured to enable JavaScript to implement polymorphism.

17 Claims, 4 Drawing Sheets

(56) References Cited

U.S. PATENT DOCUMENTS

| | | | | |
|---|---|---|---|---|
| 2005/0080880 | A1* | 4/2005 | von Tetzchner | H04M 1/72561 709/219 |
| 2006/0218538 | A1* | 9/2006 | van Kesteren | G06F 8/52 717/137 |
| 2007/0055964 | A1* | 3/2007 | Mirkazemi et al. | 717/140 |
| 2007/0245238 | A1* | 10/2007 | Fugitt | G06F 3/0481 715/700 |
| 2008/0141219 | A1* | 6/2008 | Chinnici | 717/116 |
| 2008/0235671 | A1* | 9/2008 | Kellogg | G06F 9/45529 717/139 |
| 2011/0173597 | A1* | 7/2011 | Cascaval et al. | 717/148 |
| 2011/0274258 | A1* | 11/2011 | Casalaina | H04L 12/589 379/93.01 |
| 2012/0185824 | A1* | 7/2012 | Sadler et al. | 717/120 |
| 2013/0117326 | A1* | 5/2013 | De Smet | G06F 9/4428 707/798 |

OTHER PUBLICATIONS

Balachander Krishnamurthy et al., "Generating a Privacy Footprint on the Internet", [Online], 2006, pp. 65-70, [Retrieved from Interent on Sep. 30, 2017], <http://delivery.acm.org/10.1145/1180000/1177088/p65-krishnamurthy.pdf>.*

Balachander Krishnamurthy et al., "Measuring Privacy Loss and the Impact of Privacy Protection in Web Browsing", [Online], 2007, pp. 1-12, [Retrieved from Internet on Sep. 30, 2017], <http://web.cs.wpi.edu/~cew/papers/soups07.pdf>.*

Simon Harper et al., "Middleware to Expand Context and Preview in Hypertext", [Online], 2004, pp. 1-8, [Retrieved from Internet on Sep. 30, 2017], <http://delivery.acm.org/10.1145/1030000/1028643/p63-harper.pdf>.*

* cited by examiner

JAVASCRIPT EXTENSION TOOL

TECHNICAL FIELD

Embodiments of the present disclosure generally relate to improving JavaScript programming. More specifically, embodiments of the present disclosure relate to extending JavaScript to be more fully object oriented.

BACKGROUND

Modern computing often utilizes web-based applications for processing and storing data online. Such computing enables users to use a program, such as a web browser to access programs across the internet or access and store data across the internet in a process not visible to the end user. Many web applications utilize JavaScript for programming. JavaScript is a prototype-based scripting language that is dynamic, weakly typed and has first-class functions. JavaScript has commonly been implemented as part of a web browser in order to provide enhanced user interfaces and dynamic websites. This enables programmatic access to computational objects within a host environment. JavaScript has also been used to host or work with other applications such as PDF documents, site specific browsers, and desktop widgets.

One drawback of JavaScript is that even though it may support object oriented programming styles; it does not inherently include the functionality to implement numerous important features of traditional object-oriented programming languages. Specifically, JavaScript does not conventionally include programming techniques, such as multiple inheritance, messaging, and polymorphism.

BRIEF SUMMARY OF THE INVENTION

The present disclosure includes embodiments that resolve many of the issues found in the art of JavaScript programming. Specifically, embodiments are described for implementing multiple inheritance, messaging, and polymorphism in a JavaScript environment.

Embodiments of the invention may include methods, systems, and apparatuses for extending JavaScript. The apparatus may include a multiple inheritance module configured to enable JavaScript to implement multiple inheritance. The apparatus may also include a messaging module configured to enable JavaScript to implement object oriented messaging. The apparatus may also include a polymorphism module configured to enable JavaScript to implement polymorphism.

The system may be configured to further include an electronic device and web browser operating on the electronic device and configured to access JavaScript code. The method may substantially include the functionality and embodiments described with respect to the system and apparatus. More specifically, the method may include: accessing JavaScript code that enables the implementation of multiple inheritance between one or more objects; accessing JavaScript code that enables the implementation of messaging between one or more objects; and accessing JavaScript code that enables polymorphism in one or more objects. The method may further include acts to further implement multiple inheritance, messaging, and polymorphism.

BRIEF DESCRIPTION OF THE DRAWINGS

In the drawings, which illustrate what is currently considered to be representative embodiments for carrying out the invention.

DETAILED DESCRIPTION OF THE INVENTION

Figure 1:
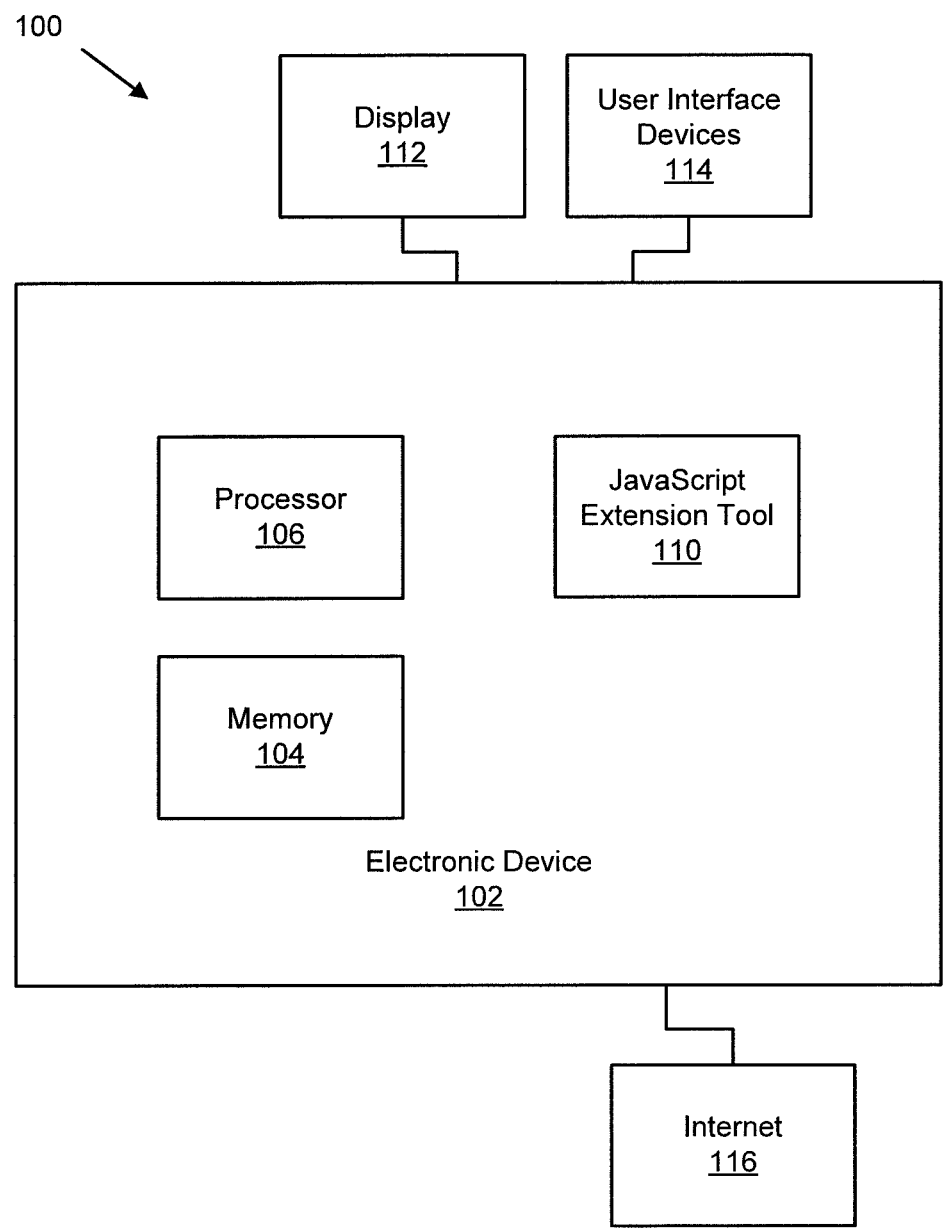
FIG. 1 is a schematic block diagram of one embodiment of a system for extending JavaScript in accordance with the present invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors, such as logic chips, transistors, or other discrete components. A module may also be implemented in programmable hardware devices, such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, refer to the same embodiment.

In the following detailed description, reference is made to the accompanying drawings, which form a part hereof, and in which is shown, by way of illustration, specific embodiments in which the invention may be practiced. These embodiments are described in sufficient detail to enable a person of ordinary skill in the art to practice the invention. However, other embodiments may be utilized, and structural, logical, and electrical changes may be made without departing from the scope of the invention. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

FIG. 1 depicts one embodiment of a system 100 for implementing multiple inheritance, messaging, and polymorphism as an extension of JavaScript. In one embodiment, the system 100 includes an electronic device 102 that includes a memory 104 and a processor 106. As will be recognized by one of skill in the art, the electronic device 102 may be a device, such as a personal computer, laptop, client, server, personal digital assistant (PDA), cell phone, smart phone, tablet computer, or the like. The electronic device 102 may be configured to execute, receive, store, or enable programming of JavaScript. The electronic device 102 may be configured with a web browser such as Internet Explorer, Firefox, Safari, Chrome, or the like in which JavaScript may be enabled. In one embodiment, the electronic device 102 may be electronically connected to the internet (e.g., the Cloud) or, for example, to an intranet running the necessary server code (e.g., and internal cloud). The electronic device 102 may include a JavaScript extension tool 110 that operates as an extension of the JavaScript language to provide multiple inheritance, messaging, and polymorphism.

In various embodiments, the electronic device 102 may also include, but is not limited to: a display 112 for displaying information to a user; a user interface device 114, such as a keyboard, mouse, touchpad, etc., that enables a user to input data to the electronic device 102; and a connection to the internet 116 or other could based network.

Figure 2:
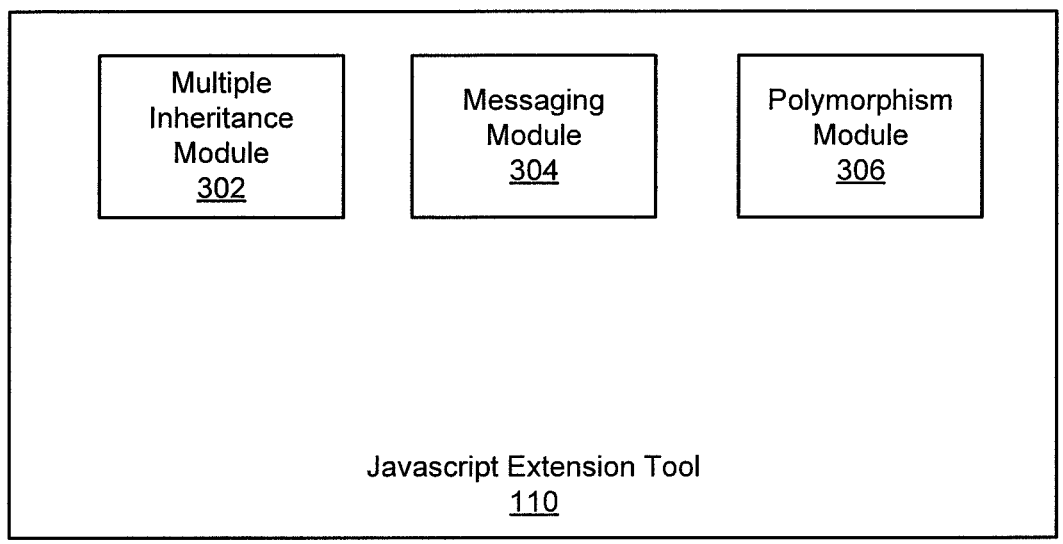
FIG. 2 is a schematic block diagram of one embodiment of a JavaScript extension tool in accordance with the present invention.

FIG. 2 is a schematic block diagram illustrating one embodiment of an extension tool 110 for JavaScript that includes the logic and functionality for implementing multiple inheritance, messaging, and polymorphism within a JavaScript environment. As depicted, the extension tool 110 includes a multiple inheritance module 202, a messaging module 204, and a polymorphism module 206. Of course in alternate embodiments, one or more modules may be used or may be combined or expanded into additional modules.

The multiple inheritance module 202 is configured to enable JavaScript to function as if it were an object oriented language that inherently includes multiple inheritance. Generally, inheritance is a way to reuse the code of existing objects, establish a subtype from an existing object, or both, depending upon programming language support. Using single inheritance, a subclass can inherit from only one superclass. For example, assume that a superclass "Person" exists, and that an instance of the 'Person' can be either a subclass 'student' or subclass 'employee' but not both. Multiple inheritance allows a class to inherit behaviors and features from more than one superclass. For example, a subclass 'studentemployee' may be created that inherits the behaviors and features of both the subclass 'student' and the subclass 'employee.' The multiple inheritance module 202 allows for both single inheritance and multiple inheritance to be implemented.

By incorporating multiple inheritance into JavaScript, developers are able to create objects and to use them again in other objects (i.e. a developer could include object A's behaviors in object B or could also include object A's and objects C's behavior in object B). Having multiple inheritance boosts efficiency dramatically, because a developer can program an object and use its behaviors and abilities in places other than the given object and instances of the given object. Inheritance takes place in the form of subclassing. In accordance with the extension tool 110, a developer defines the subclass as having the qualities of two or more superclasses, and then assigns an object to that subclass. In operation, the user identifies which object s/he would like an object to inherit the behaviors of, and then identifies which object will be receiving those behaviors. It is contemplated that this may be accomplished using a graphical interface, by using a text reference call, or by other means recognized by one of skill in the art. The multiple inheritance module 202 creates a superclass for the object whose properties are being inherited. It then makes the recipient object a subclass of the superclass. Following is an example of the code for inheritance:

```
// Make us a subclass of the common and the data dialogs
$.apps.subclass($.apps.custom, $.dlg_common);
```

In this code, $.apps.subclass( ) is a command the creates a subclass of the objects passed as parameters. In this case, those objects were 'custom' and 'dlg_common.' The new subclass inherits the behaviors and attributes of both the custom object and the common object.

In some instances, there may be an overlap of attributes or behaviors between parent classes. In order to resolve any ambiguities or conflicts, each time a subclass inherits from an additional parent class, the member functions of that newly inherited class override any function of the same name from a prior parent class. After each call to extend a class, a developer may reprogram a particular function if they wish to preserve its capability by giving it a new name. Each function can also be overridden in the new class. In the following simple example, the applet_wbenchpane class is defined and then inherits all behavior from two other classes.

```
$.apps.applet_wbenchpane = function (appid, options) {var $this = this;};
$.apps.subclass($.apps.applet_wbenchpane, $.applet_common);
$.apps.subclass($.apps.applet_wbenchpane, $.apps.contextmenuapp);
```

In a further example, an apple_wbenchpane class is defined, but each parent's class 'gethtml' function is preserved. The 'gethtml' function is then incorporated into a derived 'gethtml' function. In the derived 'gethtml' function, the settings of a member variable are used to determine which of the base classes to call.

```
$.apps.applet_wbenchpane = function (appid, options) {var $this = this;};
$.apps.subclass($.apps.applet_wbenchpane, $.applet_common);
$.apps.applet_wbenchpance.prototype.applet_gethtml =
  $.apps.applet_wbenchpance.prototype.gethtml;
$.apps.subclass($.apps.applet_wbenchpane, $.apps.contextmenuapp);
$.apps.applet_wbenchpance.prototype.wbench_gethtml =
  $.apps.applet_wbenchpance.prototype.gethtml;
$.apps.applet_wbenchpance.prototype.gethtml = function( ){
    var $this = this, o = $this.options;
  return (o.wbenchmode == true ? $this.wbench_gethtml( ) :
$this.applet_gethtml( );
};
```

The derived gethtml function may then be used to determine which of the base classes to call. In this manner, the multiple inheritance module 202 is able to implement multiple inheritance in JavaScript as if JavaScript were an object oriented language.

The messaging module 204 is configured to enable the implementation of messaging in a JavaScript environment. Messaging, as used herein, refers to the ability of an object to send and receive local and global broadcasts. Objects written using the JavaScript extension tool 110 may be configured with the ability to communicate with each other through local and global broadcasts, and those objects may be in a state of constant broadcast. The term, 'constant broadcast,' refers to an object that is constantly searching for messages with pertinent information for it and which sends a broadcast any time it is updated. An object in a state of constant broadcast receives any message intended for it and will update itself accordingly. This code may be in an optimized state, because it was written in an object-oriented manner. Like multiple inheritance, messaging is also scalable. The number of broadcasts for a given object to send and receive does not slow messaging, nor does it slow the processing speed of the program, given a reasonable computing platform.

JavaScript has two major limitations with regard to messaging. One is that related instances have to be able to "know" or "find" each other through closures or pointers. An instance of one object can only communicate with other similar objects that it has been directly connected to or wired to. This makes software development more difficult and less maintainable because each module has to be tightly coupled to all the other modules. The JavaScript extension tool 110 provides a messaging system that enables a looser coupling of modules. It allows any application instance to broadcast an event message to all other application instances. Any other "listening" instance can take action upon receipt of a message that it knows how to handle. Unlike prior art that attempts to do this through function binding of Document Object Model (DOM) elements and/or a bubbling heirarchy, the JavaScript extension tool 110 allows applications to exist that do not require on-screen DOM elements nor do they require the instances of each application to be in any specific hierarchy.

An example of use is with data objects. Data objects may be derived from a class that "knows" how to serialize their data to a server. An application can include variables that automatically know how to load and save themselves with no further assistance from the application. As such, a developer is able to program an application that includes these variable types and it does not have to have any tight coupling to the underlying engine (e.g., AJAX or SQL engine) that communicates with the server.

The messaging module 204 allows a central object updater application to routinely broadcast a message to all applications that asks "What is the ID of the data you are currently working on?" Applications can either ignore the message entirely or check to see if they should respond, and if they do respond, return the id of the data objects they are currently using. The central updater needs to have no knowledge of the inner-workings of the applications and the applications do not require any knowledge of the inner workings of the central updater. Once the central updater has polled all applications that can respond to this message, it can query the server to see if any of the objects currently being worked with have been updated or modified since the last time it checked. The server may return a list to the central updater of any updated objects. The central updater can then broadcast a message that contains the list of the update objects. Currently running applications can respond to those messages and let their data variables know a newer version is available on the server. The variables can then update themselves and the application can place the new values on the screen.

In the above example, the application developer gains the benefit of advanced database operations without having to have any knowledge of how these operations actually work.

The command for an object to retrieve messages has two parts, as follows:

A broadcaster - $.apps.calleveryapp('sys_AddGuideItem',
{ item: curItem });
And a receiver - $.apps.grid_line.prototype.sys_AddGuideItem = function (data) {...}

In the example above, an application broadcasts the message 'sys_AddGuideItem' by executing a function call to the application engine and sending parameters with the broadcast. The application engine will enumerate through all possible applications to find any running application that implements the receipt of that message. It then calls the instances of the applications that can trap that message by calling the instances implemention of that function that has the same name as the message name. In this way, the message can be broadcast to all running applications, all running applications of a particular class, or to any particular instance. The application that invoked the 'sys_AddGuideItem' message has no prior knowledge of or reliance on any particular application that might receive that message. The grid_line class can implement a 'sys_AddGuideItem' with no prior knowledge of or reliance on any particular application that might broadcast that message. Other classes are also free to receive that message and operate on it as required.

The polymorphism module 206 enables the JavaScript extension tool 110 to implement polymorphism in a JavaScript environment. Generally, polymorphism refers to a programming language's ability to process objects differently depending on their data type or class. More specifically, it is the ability to redefine methods for derived classes. For example, given a base class 'shape', polymorphism enables the programmer to define different 'area' methods for any number of derived classes, such as circles, rectangles and triangles. No matter what shape an object is, applying the 'area' method to it will return the correct results. Traditionally there are two types of Polymorphism. Parametric polymorphism (aka "generic programming") allows data types and/or functions to be used with and applied to different objects without regard to instance type. It allows the creation of things like mixed arrays whose members are of different types. Subtype polymorphism or inclusion polymorphism allows a name to denote instances of different classes as long as they are related by some common super class. In some languages, there is a concept called "interface" that allows different typed objects to be interchangeable as long as they each expose a common set of functions and/or member variables.

Some data objects created in accordance with the JavaScript extension tool 110 are polymorphic in the sense that they are "schema-less". They store their data using the JavaScript Object Notation (JSON) format, which allows for any type of data to be stored without pre-definition. In one embodiment, the polymorphism module 206 employs an "I&E" (Ignorant and Apathetic or "I don't know and I don't care") approach to the structure of the records themselves. By doing this, multiple modules can work on the same records without any pre-knowledge or understanding of other modules data requirements. Newer versions of an application can access older records and provide any missing fields with a known default. Fields in a record that an application doesn't even know about are still preserved by all applications.

In one embodiment, the JavaScript extension tool 110 has extended the Javascript language to have an application engine inside of it. In most web-based environments, the HTML is loaded first and then javascript code may come along later. This can easily be seen by right-clicking most web sites in a browser and selecting "view source". In almost every instance, a mountain of html will be returned. In accordance with the JavaScript extension tool 110, only a script of core html is the bare-minimum required to bootstrap the application engine. The application engine is then used to create HTML on the fly, only as needed, to interact with the user. This differs from conventional engines in that most web applications and sites rely on the HTML driving the Javascript, not the other way around. Even sites that generate the HTML on the fly generally do this on the server.

built-on-the-fly from applications running on the user's browser after the JavaScript extension engine has "booted" inside the browser. The JavaScript extension engine provides core functionality for launching other JavaScript extension applications, such as the multiple inheritance module 202, the messaging module 204, and the polymorphism module 206. Because of this, applications associated with the JavaScript extension tool 110 can rely on a built-in library of routines to build the HTML as needed. Part of these core-routines allows a developer to not have to worry about multiple instances of an application running.

Take an example of a user developing a web-application. Suppose a user has a data entry screen that acts exactly as intended. However, suppose the user wants the ability to edit two records on the screen at the same time. The developer would then have to re-design the entire application. In contrast, because many third party tools are already available, a standard JavaScript extension application for displaying a list of customers may look like the following:

```
// Declare this object - Any existing instance will also change
$.apps.contactlist = function (appid, options) {
    var $this = this;
    // Remember our data type and our collection type
    options.title = 'Contact List';
    options.datatype = 'Contact';
    options.collectiontype = 'contact';
    options.gridwidth = 695;
    options.editapp = 'dlgcontactedit';
    // Register our type, id and options
    $this.register('contactlist', appid, options);
    // Build the dialog
    $this.dialog(
    {
        icons: $this.geticons( ),
        width: 700,
        pintotab: true
    });
};
// Now subclass this from common dialog and from common_grid dialog
$.apps.subclass($.apps.contactlist, $.dlg_common);
$.apps.subclass($.apps.contactlist, $.dlg_common_grid);
// Define our grid
$.apps.contactlist.prototype.definegrid = function ( ) {
    var $this = this;
    // Build our columns
    $this.cols = [
        { header: 'Link ID', name: 'ndx', index: 'ndx', hidden: true, width: 100, sorttype: "int", hidedlg: true },
        { header: 'First Name', name: 'fname', index: 'fname', hidden: false, width: 100 },
        { header: 'Last Name', name: 'lname', index: 'lname', hidden: false, width: 100 },
        { header: 'Initials', name: 'ini', index: 'ini', hidden: false, width: 40 },
        { header: 'Address', name: 'addr', index: 'addr', hidden: false, width: 200 },
        { header: 'Address', name: 'addr2', index: 'addr2', hidden: true, width: 100 },
        { header: 'City', name: 'city', index: 'city', hidden: false, width: 100 },
        { header: 'State', name: 'state', index: 'state', hidden: false, width: 30 },
        { header: 'Zip', name: 'zip', index: 'zip', hidden: true, width: 50 },
        { header: 'Country', name: 'country', index: 'country', hidden: true, width: 100 },
        { header: 'Type', name: 'type', index: 'type', hidden: true, width: 100 },
        { header: 'Title', name: 'title', index: 'title', hidden: true, width: 100 },
        { header: 'Mobile Phone', name: 'mphone', index: 'mphone', hidden: false, width: 100
    }
    ];
};
```

Standard JavaScript platforms like jQuery are designed to interact with HTML and a DOM (Document Object Model) engine in the web browser. Conversely, the JavaScript extension tool 110 allows for a small amount of HTML to load a standard set of third party tools and a JavaScript extension engine (e.g., jKarate), before loading any substantial HTML code. In fact, the substantial HTML may be The above application can be launched as many times as needed from the jKarate application engine and each instance will build the appropriately unique HTML on the fly in such a way that each unique instance will only be connected to its DOM elements that are related to it. The above application is derived from two standard classes. One class has the behavior needed to create a movable dialog window on the screen, which the other class knows how to take the column definition and use that to automatically create the data objects needed and connect them to the server. The standard behavior also includes the ability to handle multiple instances, record updating, multi-user updating, access to history archiving, and restoration to prior versions of the data. Any additional behavior that is added to these base classes automatically becomes available to each derived class.

For example, after the above application was written, a requirement was added to trap the F12 key and show the user a pop-up dialog indicating where they were in the application. This behavior was added to the base dlg_common class, and all applications derived from it (including the one above) automatically received the new functionality. Undo/Redo was also implemented this way. Zero maintenance was required on the above application to add that capability as the new behavior was placed into the super-class. This saves the developers a vast amount of time in altering or changing multiple applications that inherit from a similar framework.

Figure 3:
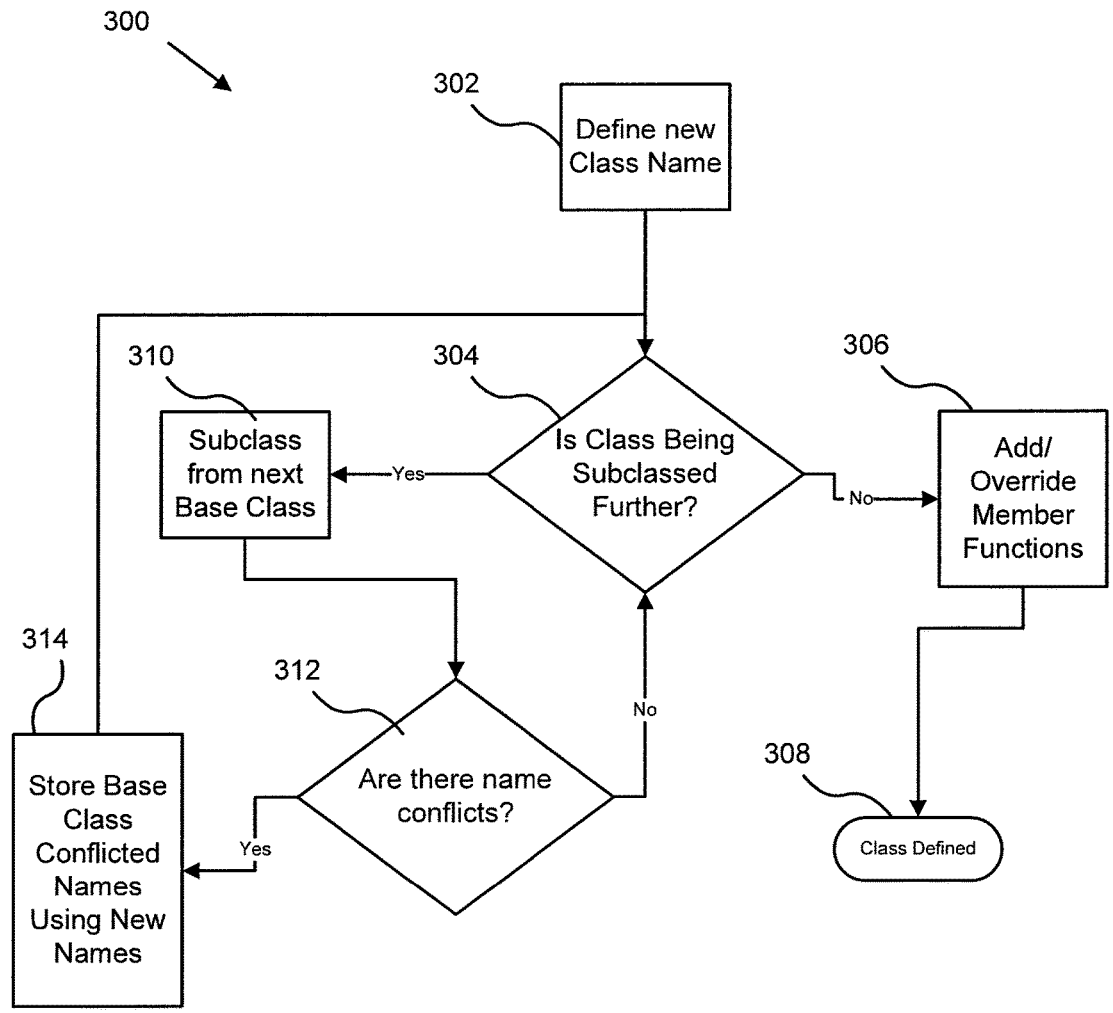
FIG. 3 is a flow chart diagram of one embodiment of a method for implementing multiple inheritance in accordance with the present invention.

FIG. 3 is a flow chart diagram depicting one example of a method 300 for implementing multiple inheritance in accordance with the present invention. The method 400 substantially includes and relates to the embodiments and implementations described above with regard to FIGS. 1 and 2.

The method 300 begins by defining 302 as a new class name. Next, it is determined 304 whether the class is being subclassed further. If the class is not being subclassed further, override member functions may be added 306 and the new class is defined 308.

If the class is being subclassed further, then a subclass from a base class is added 310. A check may be performed to determine 312 if there are name conflicts. If there are no name conflicts, then it is again determined if the class is being subclassed even further. If there are name conflicts, then the conflicting base class names may be stored 314 using new names. Then, it is again determined if the class is being subclassed further. In this manner, the method 300 enables for a new class to be defined that inherits behaviors and attributes from multiple parents.

Figure 4:
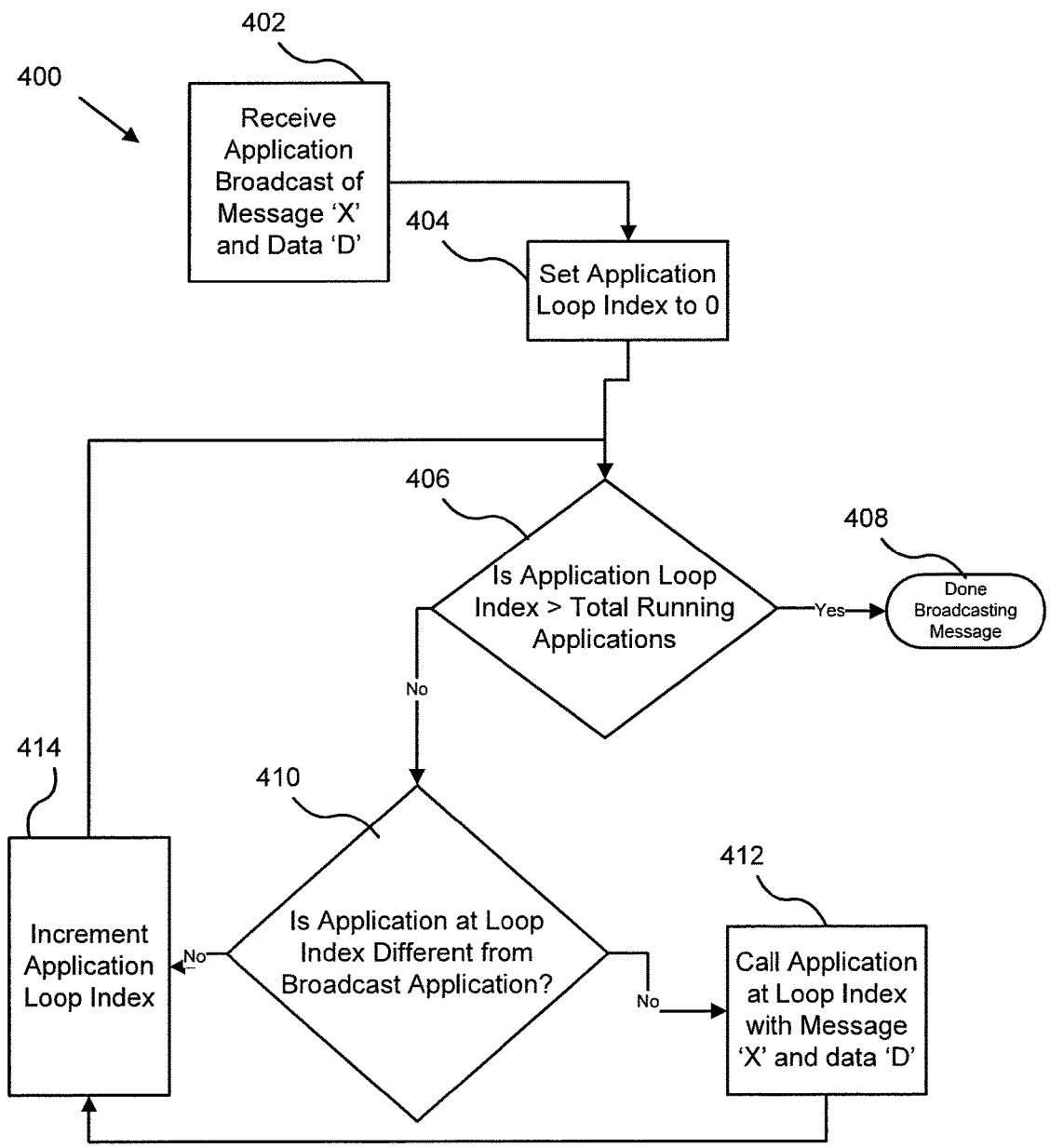
FIG. 4 is a flow chart diagram of one embodiment of a method for implementing messaging in accordance with the present invention.

FIG. 4 depicts one embodiment of a method 400 for implementing messaging in accordance with the present invention. The method 400 substantially includes and relates to the embodiments and implementations described above with regard to FIGS. 1 and 2.

The method 400 begins by receiving 402 an application broadcast of message 'X' and data 'ID'. An application loop index is set 404 to zero (0). Then, it is determined if the application loop index is greater than a number of total running applications 406. If the application loop index is greater than the number of total running applications, then message is done broadcasting 408.

If the application loop index is not greater than the number of total running applications, then it is determined if the application at the loop index is different from the broadcast application. If the application at the loop index is not different from the broadcast application, then the application at the loop index is called 412 with message 'X' and data 'D'. Then, the application loop index is incremented 414. If the application loop index is different from the broadcast application, then the application loop index is incremented 414 and it is again determined if the application loop index is greater than the number of total running applications.

These methods may be practiced in some embodiments with fewer steps or in a different order than are shown. Many additions, deletions, and modifications to the preferred embodiments may be made without departing from the scope of the invention as hereinafter claimed. Further, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for extending JavaScript, the method comprising:
    executing first JavaScript code that enables the implementation of multiple inheritance between one or more objects, is configured to create a subclass that inherits one or more behaviors from a plurality of objects passed as parameters to the subclass, and is configured to resolve conflicts between inherited behaviors by allowing a newly inherited class to over-ride a function of the same name for a prior parent class;
    executing second JavaScript code that enables a central updater to query one or more applications to determine identity (ID) of data currently associated with each application, while the central updater has no knowledge of inner-working of the one or more applications; and
    executing third JavaScript code that enables polymorphism in one or more objects;
    wherein the first JavaScript code, the second JavaScript code, and the third JavaScript code are part of a JavaScript extension tool stored in a memory of the computer and configured to operate as an extension of a JavaScript environment by being interpreted and executed at run-time.

2. An apparatus for extending JavaScript, the apparatus comprising a central processing unit (CPU) comprising:
    a JavaScript extension tool stored in a memory on the apparatus and configured to operate as an extension of a JavaScript environment by being interpreted and executed at run-time, the JavaScript extension tool comprising:
    a multiple inheritance module comprising first JavaScript code to implement multiple inheritance by interpreting the first JavaScript code at run-time on the apparatus, wherein the multiple inheritance module is configured to create a subclass that inherits one or more behaviors from a plurality of objects passed as parameters to the subclass, and configured to resolve conflicts between inherited behaviors by allowing a newly inherited class to over-ride a function of the same name for a prior parent class;
    a messaging module comprising second JavaScript code to implement messaging by interpreting the second JavaScript code at run-time on the apparatus, wherein the messaging module enables a central updater to query one or more applications to determine identity (ID) of data currently associated with each application, while the central updater has no knowledge of inner-working of the one or more applications; and
    a polymorphism module comprising third JavaScript code to implement polymorphism by interpreting the third JavaScript code at run-time on the apparatus.

3. The apparatus of claim 2, wherein the multiple inheritance module enables a user to rename a class in response to the class being overridden by another class.

4. The apparatus of claim 2, wherein the multiple inheritance module accesses a derived gethtml function to determine which of plurality of base classes to call.

5. The apparatus of claim 2, wherein the messaging module is configured to enable objects to communicate using local and global broadcasts.

6. The apparatus of claim 2, wherein the messaging module is configured to enable one or more objects to operate in a state of constant broadcast.

7. The apparatus of claim 2, wherein the messaging module does not slow messaging in response to an increased number of broadcasts.

8. The apparatus of claim 2, wherein the messaging module enables an application instance to broadcast an event message to all other application instances.

9. The apparatus of claim 2, wherein the messaging module enables a listening application instance to take action in response to receipt of a message without binding Document Object Model (DOM) elements.

10. The apparatus of claim 2, wherein the polymorphism module implements parametric polymorphism and subtype polymorphism.

11. The apparatus of claim 2, wherein the polymorphism module is configured to create schema-less data objects.

12. The apparatus of claim 11, wherein the schema-less data objects are JavaScript Object Notation (JSON) objects.

13. The apparatus of claim 2, wherein the polymorphism module implements an ignorant and apathetic approach to the structure of records.

14. The apparatus of claim 2, further comprising JavaScript extension engine configured to automatically generate HTML.

15. A system for extending JavaScript, the system comprising:
an electronic device comprising a non-transitory computer readable storage medium;
a web browser stored in a memory and operating on the electronic device and configured to access JavaScript code;
a JavaScript extension tool stored in the memory on the electronic device and configured to operate as an extension of a JavaScript environment by being interpreted and executed at run-time, the JavaScript extension tool comprising:
a multiple inheritance module comprising first JavaScript code to implement multiple inheritance by interpreting the first JavaScript code at run-time on the electronic device, wherein the multiple inheritance module is configured to create a subclass that inherits one or more behaviors from a plurality of objects passed as parameters to the subclass, and configured to resolve conflicts between inherited behaviors by allowing a newly inherited class to over-ride a function of the same name for a prior parent class;
a messaging module comprising second JavaScript code to implement messaging by interpreting the second JavaScript code at run-time on the electronic device, wherein the messaging module enables a central updater to query one or more applications to determine identity (ID) of data currently associated with each application, while the central updater has no knowledge of inner-working of the one or more applications; and
a polymorphism module comprising third JavaScript code to implement polymorphism by interpreting the third JavaScript code at run-time on the electronic device.

16. The system of claim 15, further comprising one or more web based applications.

17. The system of claim 15, further comprising one or more web based storage devices that are accessible by the electronic device.

* * * * *